United States Patent

Sunagawa

[11] Patent Number: 5,315,676
[45] Date of Patent: May 24, 1994

[54] OPTICAL WAVEGUIDE DEVICE

[75] Inventor: Hiroshi Sunagawa, Kanagawa, Japan

[73] Assignee: Fuji Photo Film Co., Ltd., Kanagawa, Japan

[21] Appl. No.: 117,617

[22] Filed: Sep. 8, 1993

[30] Foreign Application Priority Data

Sep. 9, 1992 [JP] Japan .................................. 4-241004

[51] Int. Cl.$^5$ .............................................. G02B 6/26
[52] U.S. Cl. ........................................ 385/37; 359/575
[58] Field of Search ............... 359/566, 568, 569, 572, 359/573, 575; 385/37, 10, 12, 15, 4, 146, 901

[56] References Cited

U.S. PATENT DOCUMENTS

| 4,778,991 | 10/1988 | Nozaki et al. | 250/235 |
| 4,936,665 | 6/1990 | Whitney | 359/573 |
| 4,961,632 | 10/1990 | Hatori et al. | 350/96.13 |
| 5,101,458 | 3/1992 | Spaulding et al. | 385/37 |
| 5,101,459 | 3/1992 | Sunagawa | 385/37 |

FOREIGN PATENT DOCUMENTS 61-286807 12/1986 Japan .
1107213 4/1989 Japan .

Primary Examiner—Rodney B. Bovernick
Assistant Examiner—John Ngo
Attorney, Agent, or Firm—Sughrue, Mion, Zinn, Macpeak & Seas

[57] ABSTRACT

An optical waveguide device comprises an optical waveguide for guiding an optical wave therethrough, and a grating coupler located on a surface of the optical waveguide in order to radiate the guided optical wave, which travels in the optical waveguide, out of the optical waveguide. The grating coupler is provided with a plurality of bars, the heights h of which increase approximately linearly and little by little in the direction along which the guided optical wave travels. The inclination b of the variation of the bar heights h satisfies the condition $$b \geq 2 \left( \frac{m}{aL^{m+1}} \right)^{1/m}$$

where a represents a coefficient which determines a radiation loss coefficient $\alpha$ ($\alpha = ah^m$, where $2 < m$), and L represents the length of the grating coupler, which length is taken in the direction along which the guided optical wave travels. The guided optical wave is radiated very efficiently as an approximately Gaussian beam out of the optical waveguide, or an external optical wave, which takes on the form of a Gaussian beam, is introduced very efficiently into the optical waveguide.

8 Claims, 3 Drawing Sheets

OPTICAL WAVEGUIDE DEVICE

BACKGROUND OF THE INVENTION

1. Field of the Invention

This invention relates to an optical waveguide device. This invention particularly relates to an optical waveguide device, which has an optical waveguide for guiding an optical wave therethrough and a grating coupler disposed on the surface of the optical waveguide such that the guided optical wave may be radiated by the grating coupler out of the optical waveguide, or such that an external optical wave may be introduced by the grating coupler into the optical waveguide.

2. Description of the Prior Art

Recently, a light deflector utilizing an optical waveguide has been proposed in, for example, Japanese Unexamined Patent Publication No. 62(1987)-77761 which corresponds to U.S. Pat. No. 4,778,991. The proposed light deflector comprises a slab-shaped optical waveguide, which is constituted of a material capable of propagating a surface acoustic wave therethrough, and a means for generating a surface acoustic wave in the optical waveguide such that the surface acoustic wave may travel in a direction that intersects an optical path of an optical wave guided by the optical waveguide. The frequency of the surface acoustic wave is changed continuously. By way of example, the means for generating a surface acoustic wave is constituted of an interdigital transducer and a driver for applying an alternating voltage, the frequency of which changes continuously, to the interdigital transducer.

With the aforesaid light deflector, the optical wave guided by the optical waveguide undergoes Bragg diffraction due to an acousto-optic interaction with the surface acoustic wave. The angle of diffraction changes in accordance with the frequency of the surface acoustic wave. Therefore, by varying the frequency of the surface acoustic wave in the manner described above, the optical wave can be deflected continuously in the optical waveguide.

Also, a novel light modulator has been proposed in, for example, Japanese Unexamined Patent Publication No. 1(1989)-178918 which corresponds to U.S. Pat. No. 4,961,632. With the proposed light modulator, the intensity of a surface acoustic wave, which travels through an optical waveguide, is modulated (or the surface acoustic wave is turned on and off), and Bragg diffraction of an optical wave guided by the optical waveguide is thereby controlled.

The optical wave, which has been deflected or modulated in the manner described above, can be radiated out of the optical waveguide by a grating coupler, a prism coupler, or the like, which is formed on the surface of the optical waveguide.

A recording medium may be scanned with an optical wave, which has been radiated out of the optical waveguide device constituted in the manner described above, and an image may thereby be recorded on the recording medium. In such cases, in order for a highly accurate image to be recorded, it is necessary that the scanning optical wave be converged into a small beam spot and the beam spot has a Gaussian intensity distribution at least with respect to a sub-scanning direction.

Also, in order for an optical wave utilization efficiency to be kept high, it is necessary that a guided optical wave be radiated out of an optical waveguide as efficiently as possible (e.g. at an efficiency of approximately 100%).

However, in cases where a guided optical wave is radiated out of an optical waveguide by using a grating coupler, it is very difficult for a beam spot having a Gaussian intensity distribution to be obtained. FIG. 5 is an explanatory view showing how the intensity of an optical wave, which has been radiated out of a grating coupler of a conventional optical waveguide device, is distributed. In FIG. 5, a linear grating coupler 42, which has uniform bar height and pitch, is located on the surface of an optical waveguide 41 formed on a substrate 40, and a guided optical wave 43 is radiated out of the optical waveguide 41. In such cases, as indicated by curve g, the intensity of a radiated optical wave 43' decreases exponentially with respect to the direction along which the guided optical wave 43 travels.

The exponential decrease in the intensity of the radiated optical wave 43' will hereinbelow be described in more detail. It is known that loss of the amount of the guided optical wave 43, $\Delta I$, (output optical amount) for a small region $\Delta x$ of the grating coupler is expressed as $$\Delta I = \frac{dI(x)}{dx} = -2\alpha I(x) \tag{1}$$

where $I(x)$ represents the amount of the guided optical wave 43, and $\alpha$ represents the radiation loss coefficient. The radiation loss coefficient $\alpha$ is expressed as $$\alpha = ah^m \tag{2}$$

where h represents the heights of bars (or the depths of grooves) of the grating coupler, and a represents a coefficient. Solving the differential equation of Formula (1) under the boundary conditions of $I(x) = I_o$ for $x=0$ yields $$I(x) = I_o e^{-2\alpha x} \tag{3}$$

From Formula (3), the entire amount of the radiated optical wave per unit length is expressed as $$-\frac{dI(x)}{dx} = 2\alpha I_o e^{-2\alpha x} \tag{4}$$

In general, in the cases of rectangular gratings, the optical wave, which has been radiated out of a rectangular grating, is not constituted of a single wave, but multiple beam coupling is effected. Also, in the cases of weak coupling (i.e. when the radiation loss coefficient $\alpha$ is small), the ratio, P, of a radiated optical wave, which is to be utilized, to the entire radiated optical wave is constant. The intensity, $J(x)$, of the optical wave to be utilized, which is radiated from a certain position x, is expressed as $$J(x) = -\left(\frac{dI(x)}{dx}\right)P$$

Substitution of $J(x)$ into Formula (4) yields $$J(x) = 2\alpha P I_o e^{-2\alpha x} \tag{5}$$

For a grating coupler having uniform bar height, the value of h is constant, and substitution of Formula (2) into Formula (5) yields $$J(x) = 2P \cdot (ah^m) e^{-2ah^m x}$$

Therefore, it can be known that the optical wave, which has been radiated out of a grating coupler having uniform bar height, has an exponentially decreasing intensity distribution.

In cases where a guided optical wave is to travel in the optical waveguide as shown in FIG. 5 and is deflected with a surface acoustic wave, the direction of the deflection (i.e. the main scanning direction) intersects the plane of the sheet of FIG. 5, and the sub-scanning direction is indicated by the arrow v. Specifically, the radiated optical wave 43' has an intensity distribution such that the intensity may decrease or increase exponentially with respect to the sub-scanning direction. Therefore, it is very difficult for a beam spot to be obtained which has a Gaussian intensity distribution with respect to the sub-scanning direction.

The aforesaid problem occurs when a guided optical wave is radiated by a grating coupler out of an optical waveguide. In cases where an external optical wave is introduced into the optical waveguide by using the grating coupler, the problem occurs in that the incident coupling efficiency cannot be kept high. Specifically, as can be understood from the reciprocity theorem regarding radiation and incidence of an optical wave, unless the incident optical wave has the intensity distribution indicated by curve g in FIG. 5, an optical wave cannot be introduced into the optical waveguide at a high efficiency as a whole. However, in general, optical waves produced by light sources, such as laser beam sources, have Gaussian intensity distributions with respect to the directions of diameters of optical wave beams. It is very difficult for such optical waves to be shaped into beams having an intensity distribution such that the intensity decreases or increases exponentially.

A novel grating coupler for solving the aforesaid problems has been proposed in Japanese Unexamined Patent Publication No. 61(1986)-286807. The proposed grating coupler is provided with bars having depths which are increased gradually in the direction along which a guided optical wave travels. However, this publication does not indicate anything about how the rate of change of the bar depths should be set for obtaining an approximately Gaussian radiated beam from the grating coupler and radiating a guided optical wave out of the grating coupler at a high efficiency (e.g. approximately 100%).

A different novel grating coupler for solving the aforesaid problems has been proposed in Japanese Unexamined Patent Publication No. 1(1989)-107213. The proposed grating coupler is provided with bars having heights which vary in a mountain pattern in the direction along which a guided optical wave travels. This publication indicates in detail how the heights of the bars of the grating coupler should be varied for obtaining an approximately Gaussian radiated beam from the grating coupler. However, the grating coupler provided with the bars having heights which vary in a mountain pattern is very difficult to fabricate.

Also, Japanese Unexamined Patent Publication No. 1(1989)-107213 does not indicate anything about how the heights of the bars of the grating coupler should be varied for radiating a guided optical wave out of the grating coupler at a high efficiency.

In Japanese Unexamined Patent Publication No. 4(1992)-40404, an optical waveguide device is disclosed wherein the heights of bars of a grating coupler are defined strictly such that the problems described above can be solved. Though the problems described above can be solved with the disclosed optical waveguide device, it has the drawbacks in that it is effective only when m=2 in Formula (2). It has heretofore been considered that the radiation loss coefficient $\alpha$ will be expressed as $\alpha = ah^2$. However, according to research carried out recently, it was confirmed that the radiation loss coefficient $\alpha$ may often be expressed as $\alpha = ah^m$, wherein 2<m, depending upon the structure of the optical waveguide, or the like.

SUMMARY OF THE INVENTION

The primary object of the present invention is to provide an optical waveguide device, wherein a grating coupler located on the surface of an optical waveguide is utilized and, even if m in Formula (2) takes a value larger than 2, a guided optical wave is radiated very efficiently as an approximately Gaussian beam out of the optical waveguide.

Another object of the present invention is to provide an optical waveguide device, wherein a grating coupler located on the surface of an optical waveguide is utilized and, even if m in Formula (2) takes a value larger than 2, an external optical wave, which takes on the form of a Gaussian beam, is introduced very efficiently into the optical waveguide.

The present invention provides a first optical waveguide device comprising:
i) an optical waveguide for guiding an optical wave therethrough, and
ii) a grating coupler located on a surface of the optical waveguide in order to radiate the guided optical wave, which travels in the optical waveguide, out of the optical waveguide, wherein the grating coupler is provided with a plurality of bars, the heights h of which increase approximately linearly and little by little in the direction along which the guided optical wave travels, and the inclination b of the variation of the bar heights h satisfies the condition $$b \geq 2 \left( \frac{m}{aL^{m+1}} \right)^{1/m}$$

where a represents a coefficient which determines a radiation loss coefficient $\alpha$ ($\alpha = ah^m$, where 2<m), and L represents the length of the grating coupler, which length is taken in the direction along which the guided optical wave travels.

The present invention also provides a second optical waveguide device comprising:
i) an optical waveguide for guiding an optical wave therethrough, and
ii) a grating coupler located on a surface of the optical waveguide in order to introduce an external optical wave into the optical waveguide, wherein the grating coupler is provided with a plurality of bars, the heights h of which decrease approximately linearly and little by little in the direction along which the guided optical wave travels, and the inclination b of the variation of the bar heights h satisfies the condition $$b \geq 2\left(\frac{m}{aL^{m+1}}\right)^{1/m} \quad (5)$$

where a represents a coefficient which determines a radiation loss coefficient $\alpha$ ($\alpha = ah^m$, where $2 < m$), and L represents the length of the grating coupler, which length is taken in the direction along which the guided optical wave travels.

How the optical waveguide device in accordance with the present invention works will be described hereinbelow with reference to FIGS. 1A, 1B, 1C, and 1D. In FIG. 1A, an optical waveguide 11 is located on a substrate 12, and a grating coupler 21 is located on the surface of the optical waveguide 11. A guided optical wave 14' traveling in the optical waveguide 11 is radiated out of the optical waveguide 11 by the grating coupler 21.

As described above, loss of the amount of the guided optical wave, $\Delta I$, (i.e. the output optical amount) for a small region $\Delta x$ of the grating coupler 21 is expressed as $$\Delta I = \frac{dI(x)}{dx} = -2\alpha I(x) \quad (1)$$

where x represents the position with respect to the direction along which the guided optical wave travels (a position located on the side downstream in the direction, along which the guided optical wave travels, is taken as positive), I(x) represents the amount of the guided optical wave, and $\alpha$ represents the radiation loss coefficient. The radiation loss coefficient $\alpha$ is expressed as $$\alpha = ah^m(x) \quad (2)$$

where h(x) represents the heights of the bars of the grating coupler, and a represents a coefficient.

As shown in FIG. 1B, the bar heights h(x) increase linearly and monotonously. Therefore, the bar heights h(x) are expressed as $$h(x) = bx \quad (6)$$

where b represents a fixed number (i.e. the inclination). Unlike the cases where the bar heights h are uniform, in order for the intensity distribution of a radiated optical wave 14" to be found from the intensity distribution of the guided optical wave 14', it is necessary that the functions of Formulas (2) and (6) be substituted into the differential equation of Formula (1). Such substitution yields $$\frac{dI(x)}{dx} = -2a(bx)^m I(x)$$

An opera ion of this formula under the boundary conditions of $I = I_o$ for $x = 0$ yields $$\ln\left(\frac{I}{I_o}\right) = -2\frac{a}{(m+1)b}(bx)^{m+1} \quad (7)$$

-continued $$\therefore I(x) = I_o \exp\left\{-2\frac{a}{(m+1)b}(bx)^{m+1}\right\}$$

Formula (7) represents the intensity distribution of the guided optical wave 14'.

It is considered that the intensity of the entire radiated optical wave, including the radiated optical wave 14", corresponds to loss of the intensity of the guided optical wave 14'. Differentiation of Formula (7) yields $$-\frac{dI(x)}{dx} = 2a(bx)^m I_o \exp\left\{-2\frac{a}{(m+1)b}(bx)^{m+1}\right\} \quad (8)$$

As described above for uniform bar heights h, in the cases of weak coupling, the ratio, P, of the radiated optical wave 14", which is to be utilized, to the entire radiated optical wave may be regarded as being constant regardless of the distribution of the bar heights. Therefore, the intensity distribution, J(x), of the radiated optical wave 14" to be utilized is expressed as $$J(x) = P\left(-\frac{dI(x)}{dx}\right) \quad (9)$$

$$= 2P \cdot a(bx)^m I_o \exp\left\{-2\frac{a}{(m+1)b}(bx)^{m+1}\right\}$$

Specifically, the intensity distribution of the radiated optical wave is determined when the following factors are known:

(1) the coefficient a for the radiation loss coefficient $\alpha$ and the bar heights h, (2) the inclination b of the variation of the bar heights h, and (3) the ratio P of the radiated optical wave, which is to be utilized, to the entire radiated optical wave.

How an intensity distribution of the radiated optical wave, which is very close to the Gaussian distribution, is obtained will be described hereinbelow.

In cases where an optical wave, which takes on the form of a Gaussian beam, is introduced into or radiated out of a grating coupler having a length L in the direction of the period of bars, the position associated with a radiated optical wave having the maximum intensity is found in the manner described below. Formula (9) is differentiated. From the formula $$\frac{dJ(x)}{dx} =$$

$$2aI_oP(bx)^{m-1}\{mb - 2a(bx)^{m+1}\} \cdot \exp\left\{\frac{-2a(bx)^{m+1}}{(m+1)b}\right\}$$

the maximum optical intensity position xm is expressed as $$x_m = \frac{1}{b}\left(\frac{mb}{2a}\right)^{1/(m+1)} \quad (10)$$

By setting $L = 2x_m$, almost all of the guided optical wave 14' can be radiated, and the intensity of the radiated optical wave at an end of the grating coupler can be kept sufficiently low such that a side lobe may be prevented from occurring. Such effects will be described hereinbelow.

Substitution of the formula $$L = 2x_m = \frac{2}{b}\left(\frac{mb}{2a}\right)^{1/(m+1)} \quad (11)$$

into Formula (7) representing the intensity distribution of the guided optical wave 14' yields $$I(L) = I_0 \exp\left(-2^{m+1}\frac{m}{m+1}\right)$$

Therefore, when $2 < m$, the formula $$\frac{I(L)}{I_0} < 4.8 \times 10^{-3}$$

obtains. Specifically, as shown in FIG. 1C, 99.5% of the guided optical wave 14' is radiated out. Therefore, it is clear that this design is appropriate.

The intensity of the optical wave radiated from the position $x = L$ is sufficiently lower than the maximum optical intensity Jmax = J(xm). Such an effect will be described hereinbelow.

The following formula obtains:

$$\frac{J(L)}{J_{max}} = \frac{J(2x_m)}{J(x_m)} = 2^m \exp\left\{\frac{m}{m+1}(1 - 2^{m+1})\right\}$$

Also, when $2 < m$, the following formula $$\frac{J(L)}{J_{max}} < 4e^{-14/3} = 0.038$$

obtains. Specifically, as shown in FIG. 1D, the intensity of the optical wave radiated from the position $x = L$ is sufficiently low, i.e. is less than 3.8% of the peak of the approximate Gaussian distribution. Also, it can be understood that the intensity distribution of the radiated optical wave, J(x), is close to a Gaussian distribution.

From the foregoing, it can be understood that values of a and b, which satisfy Formula (11), should be selected for the length L of the grating coupler. Specifically, when the inclination b of the variation of the bar heights h is set to $$b = 2\left(\frac{m}{aL^{m+1}}\right)^{1/m}$$

the radiated optical wave 14" having an approximately Gaussian intensity distribution can be obtained.

The length L of the grating coupler may be longer than the length associated with the inclination b. Therefore, the inclination b of the variation of the bar heights h may be set according to the formula $$b \geq 2\left(\frac{m}{aL^{m+1}}\right)^{1/m} \quad (12)$$

As described above, with the first optical waveguide device in accordance with the present invention, the grating coupler, which is located on the surface of the optical waveguide in order to radiate the guided optical wave out of the optical waveguide, is provided with a plurality of bars, the heights of which increase approximately linearly and little by little in the direction along which the guided optical wave travels. Also, the inclination b of the variation of the bar heights h satisfies the condition $$b \geq 2\left(\frac{m}{aL^{m+1}}\right)^{1/m}$$

where a represents a coefficient which determines the radiation loss coefficient $\alpha$ ($\alpha = ah^m$, where $2 < m$), and L represents the length of the grating coupler, which length is taken in the direction along which the guided optical wave travels. Therefore, an optical wave having an approximately Gaussian intensity distribution can be radiated out of the grating coupler.

Accordingly, with the first optical waveguide device in accordance with the present invention, the optical wave, which has been radiated out of the optical waveguide, can be converged to a very small spot. In cases where the first optical waveguide device in accordance with the present invention is employed in a light deflector for recording or reading out an image, the accuracy, with which an image is recorded or read out, can be kept high. In cases where the first optical waveguide device in accordance with the present invention is employed in a high-frequency spectrum analyzer, the resolution of frequency analysis can be kept high.

With the second optical waveguide device in accordance with the present invention, the grating coupler, which is located on the surface of the optical waveguide in order to introduce an external optical wave into the optical waveguide, is provided with a plurality of bars, the heights of which decrease approximately linearly and little by little in the direction along which the guided optical wave travels. Also, the inclination b of the variation of the bar heights h satisfies the same condition as that defined in the first optical waveguide device in accordance with the present invention. Therefore, an external optical wave, such as an ordinary laser beam, which has a Gaussian intensity distribution, can be introduced efficiently into the optical waveguide. Accordingly, with the second optical waveguide device in accordance with the present invention, by directly utilizing an optical wave, such as an ordinary laser beam, without shaping it, the efficiency, with which the optical wave is utilized, can be kept high in a light deflector, a high-frequency spectrum analyzer, or the like.

DESCRIPTION OF THE PREFERRED EMBODIMENTS

The present invention will hereinbelow be described in further detail with reference to the accompanying drawings.

Figure 1A:
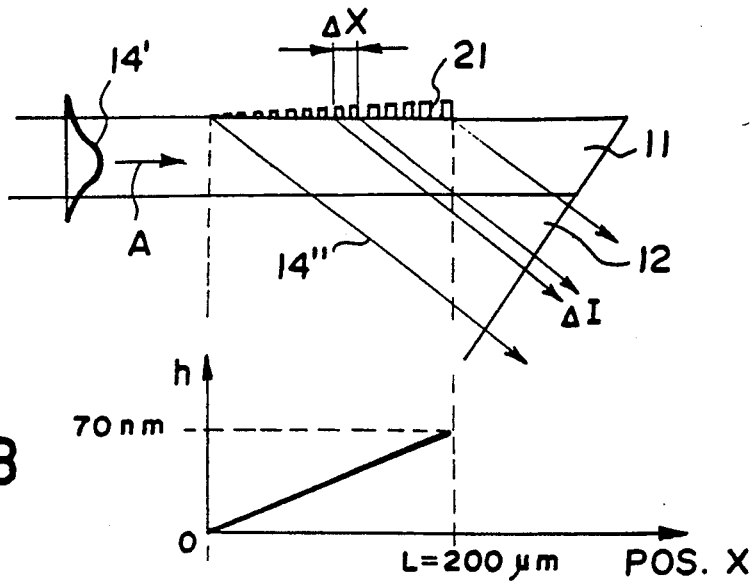
FIGS. 1A, 1B, 1C, and 1D are explanatory diagrams showing the effects of an embodiment of the optical waveguide device in accordance with the present invention.
Figure 2:
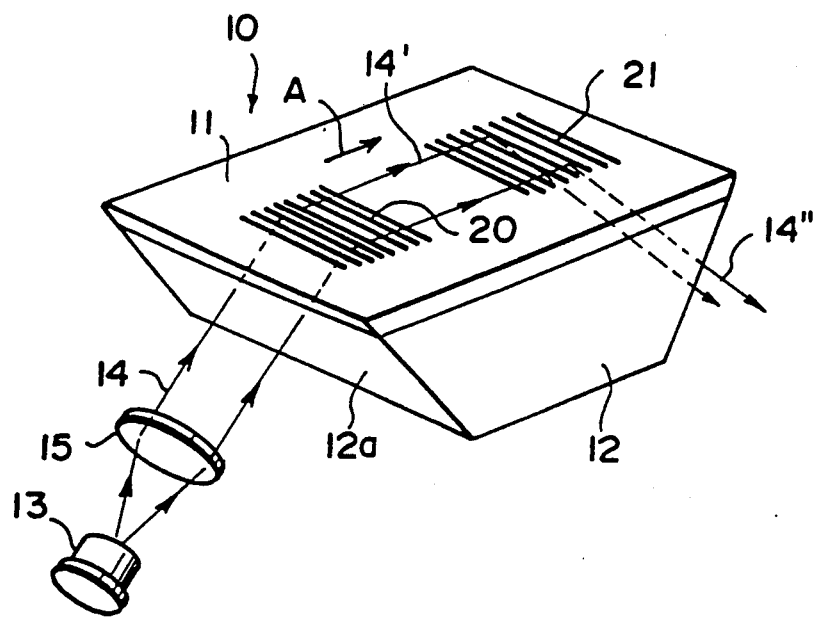
FIG. 2 is a perspective view showing the embodiment of the optical waveguide device in accordance with the present invention.

FIG. 1A is a partial side view showing an embodiment of the optical waveguide device in accordance with the present invention. FIG. 2 is a perspective view showing the embodiment of the optical waveguide device in accordance with the present invention. An optical waveguide device 10 comprises a transparent substrate 12, a slab-shaped optical waveguide 11 formed on the substrate 12, a linear grating coupler (hereinafter referred to as the "LGC") 20 for entry of an optical wave, and an LGC 21 for radiation of an optical wave. The LGCs 20 and 21 are located on the surface of the optical waveguide 11 and spaced apart from each other.

In this embodiment, by way of example, the substrate 12 is constituted of an X-cut wafer of $LiNbO_3$, and the optical waveguide 11 is formed by overlaying a proton exchange layer on the surface of the wafer. Alternatively, the substrate 12 may be constituted of a crystalline material, such as sapphire or Si. Also, the optical waveguide 11 need not necessarily be constituted of a Ti-diffused film, and may be formed by overlaying a film of any of other suitable materials on the substrate 12 by a sputtering process, a vacuum evaporation process, or the like.

A semiconductor laser 13 produces a laser beam (i.e. an optical wave) 14 having a wavelength of 640 nm in a direction which is normal to an end face 12a of the substrate 12. The end face 12 has been cut obliquely. The optical wave 14, which takes on the form of a divergent beam, is collimated by a collimator lens 15. The collimated optical wave 14 enters into the substrate 12 from the end face 12a, passes through the optical waveguide 11, and impinges upon the LGC 20 located on the surface of the optical waveguide 11. The optical wave 14 is then diffracted by the LGC 20, enters into the optical waveguide 11, and travels as a guided optical wave 14' in the direction indicated by the arrow A in the guided mode through the optical waveguide 11. The guided optical wave 14' is then diffracted by the LGC 21 and is radiated out of the optical waveguide 11 toward the substrate 12.

As shown in FIG. 1A, the LGC 21 for radiation of an optical wave is constituted such that the bar heights h may increase linearly and little by little with respect to the direction along which the guided optical wave 14' travels (i.e. with respect to the length direction of the LGC 21). Therefore, a radiated optical wave 14" has an approximately Gaussian intensity distribution with respect to the direction along which the guided optical wave 14' travels. The approximately Gaussian intensity distribution is indicated by curve f in FIG. 1D. Such effects will be described hereinbelow.

In this embodiment, the thickness of the Ti-diffused optical waveguide 11 is approximately 2.1 $\mu$m, and the guided optical wave 14' travels with the Y propagation. Also, the length L of the LGC 21 is equal to 400 $\mu$m, and the pitch $\Lambda$ of the bars is equal to 3.3 $\mu$m. The value of m in Formula (2) concerning the radiation loss coefficient $\alpha$ of the LGC 21 is equal to 3.7. The radiation loss coefficient $\alpha$ is 10 $mm^{-1}$ for a bar height h of 70 nm. Therefore, from Formula (2), the coefficient a is calculated with the formula $$a = 10 \times 10^{-3}/0.07^{3.7} = 188[\mu m^{-4.7}]$$

Figure 1B:
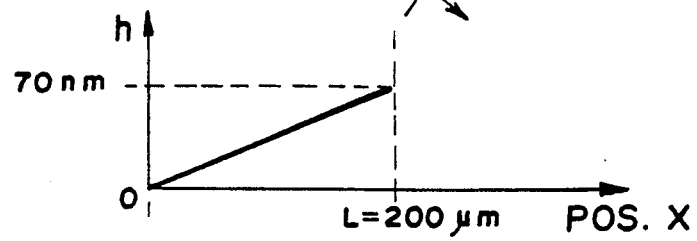
Figure 1C:
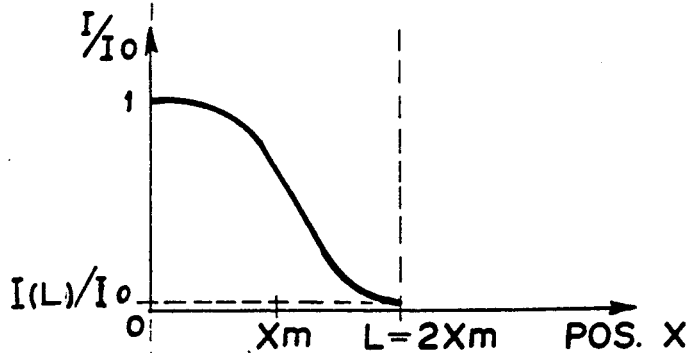
Figure 1D:
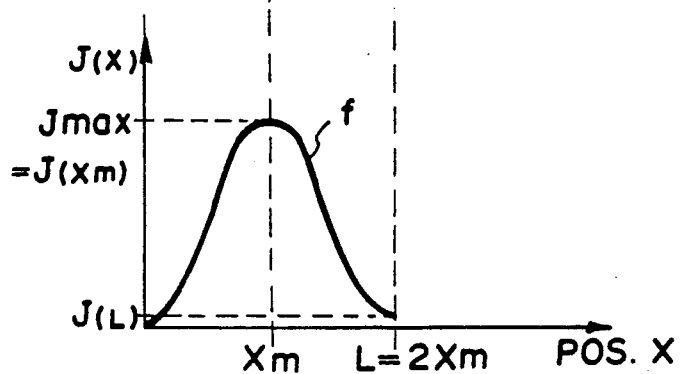

Also, the bar height h at the position of x=200 $\mu$m is equal to 70 nm. Therefore, the inclination b of the variation of the bar heights h is set such that Formula (12) including the equal sign may be satisfied, and the bar height h may increase from 0 to 70 nm for L=0 to 200 $\mu$m as shown in FIG. 1B. Specifically, the inclination b is set to $$b = 70 \; nm/200 \; \mu m = 3.5 \times 10^{-4}$$

In such cases, the following formula $$2\left(\frac{m}{aL^{m+1}}\right)^{1/m} = 2\left(\frac{3.7}{188 \times 400^{4.7}}\right)^{1/3.7} = 3.4 \times 10^{-4}$$

obtains. Therefore, Formula (12) is satisfied.

Figure 4:
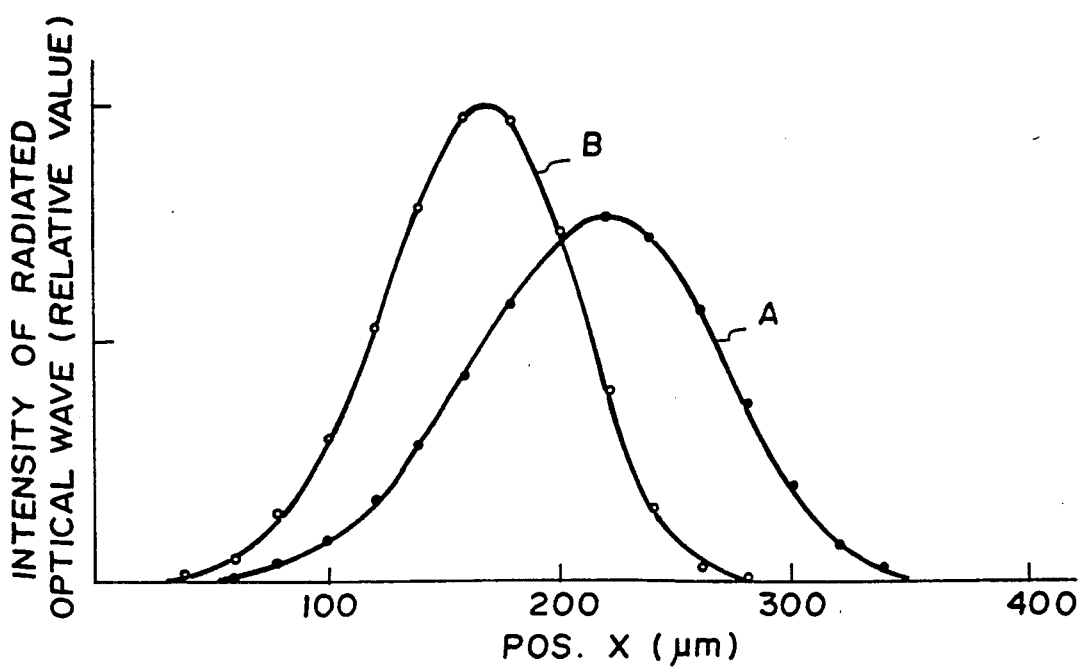
FIG. 4 is a graph showing the intensity distribution of an optical wave, which has been radiated out of the grating coupler.
Figure 5:
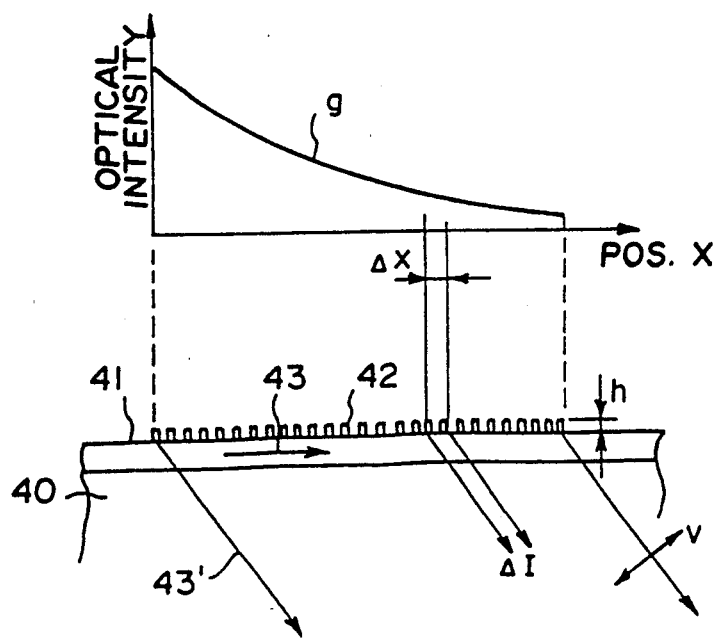
FIG. 5 is an explanatory view showing how the intensity of an optical wave, which has been radiated out of a grating coupler of a conventional optical waveguide device, is distributed.

The intensity distribution of the optical wave 14", which has been radiated out of the optical waveguide 11 by the LGC 21, was calculated by using the aforesaid values of a and b and Formula (9). The results of the calculation are indicated by curve A in FIG. 4. As shown in FIG. 4, the radiated optical wave 14" has an approximately Gaussian intensity distribution. In cases where a minus first-order optical wave is selected as the radiated optical wave which is to be utilized, the power distribution ratio P is 0.74, and 99.5% of the guided optical wave can be radiated out. Therefore, approximately 74% of the guided optical wave 14' can be radiated as the radiated optical wave 14" out of the optical waveguide 11. In such cases, a proportion of 70% was found during experiments.

Figure 3:
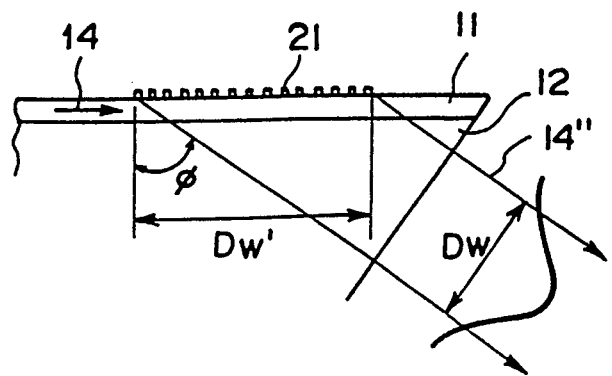
FIG. 3 is an explanatory view showing the relationship between the length of a grating coupler and the beam diameter of a radiated optical wave.

In this embodiment, a beam diameter Dw' projected onto the LGC 21 as shown in FIG. 3 is equal to 210 mm, a beam exit angle $\phi$ is equal to 66°. Therefore, a (1/$e^2$) diameter Dw, i.e. the exit beam diameter associated with an optical intensity which is equal to 1/$e^2$ of the maximum value, becomes equal to 85 $\mu$m.

A different embodiment of the optical waveguide device in accordance with the present invention will be described hereinbelow.

This embodiment is identical with the optical waveguide device 10 of the aforesaid embodiment, except that a cladding layer constituted of hafnium oxide is overlaid on the LGC 21. In such cases, the radiation loss coefficient $\alpha$ is 20 $mm^{-1}$ for a bar height h of 70 nm. Therefore, from Formula (2), the coefficient a is calculated with the formula $$a = 20 \times 10^{-3}/0.07^{3.7} = 376[\mu m^{-4.7}]$$

Also, the bar height h at the position of x=200 $\mu$m is equal to 50 nm. Therefore, the inclination b of the variation of the bar heights h is set to $$b = 50 \; nm/200 \; \mu m = 3.5 \times 10^{-4}$$

In such cases, selecting L=350 $\mu$m (>2 xm) as the length of the LGC 21 yields $$2\left(\frac{m}{aL^{m+1}}\right)^{1/m} = 3.4 \times 10^{-4}$$

Therefore, Formula (12) is satisfied.

In such cases, the intensity distribution of the optical wave 14″, which was calculated by using the aforesaid values of a and b and Formula (9), is indicated by curve B in FIG. 4. As shown in FIG. 4, in this embodiment, the radiated optical wave 14″ has an approximately Gaussian intensity distribution.

In the embodiments described above, the optical wave 14″ is radiated out of the LGC 21 toward the substrate 12. The optical waveguide device in accordance with the present invention is also applicable when the optical wave 14″ is radiated to the side opposite to the substrate 12. In such cases, only the value of the power distribution ratio P changes, and a radiated optical wave having an approximately Gaussian intensity distribution can be obtained with the same effects as those described above.

Also, in the aforesaid embodiments, the optical waveguide device in accordance with the present invention is applied to the LGC 21 for radiation of an optical wave. The optical waveguide device in accordance with the present invention is also applicable to the LGC 20 for entry of an optical wave. In such cases, the LGC 20 is formed such that the heights h of the bars may decrease approximately linearly and little by little in the direction along which the guided optical wave travels. In this manner, effects which are reciprocal to those in the aforesaid embodiment can be obtained. Specifically, in such cases, an optical wave, such as an ordinary laser beam, which have an approximately Gaussian intensity distribution, is used as the optical wave 14 to be introduced into the optical waveguide 11, and the $(1/e^2)$ diameter is set to an appropriate value. The optical wave 14 can thereby be introduced into the optical waveguide 11 at an approximately maximum incident coupling efficiency.

The optical waveguide device in accordance with the present invention is also applicable in the same manner when a guided optical wave and an external optical wave are coupled with each other by a focusing grating coupler.

When the optical waveguide device in accordance with the present invention is fabricated, problems will often occur in that the bar heights vary in a curve pattern or a straight line representing the inclination of the variation of the bar heights deviates slightly from the desirable line. The optical waveguide device in accordance with the present invention is meant to embrace within its scopes such grating couplers insofar as the aforesaid effects are obtained substantially.

Also, the grating coupler may be obtained by forming grooves in the optical waveguide through an etching process, or the like. In such cases, the depths of the grooves corresponds to the bar heights h. Therefore, the depths of the grooves may be increased or decreased approximately linearly and little by little in the direction along which the guided optical wave travels.

What is claimed is:

1. An optical waveguide device comprising:
   i) an optical waveguide for guiding an optical wave therethrough, and
   ii) a grating coupler located on a surface of the optical waveguide in order to radiate the guided optical wave, which travels in the optical waveguide, out of the optical waveguide,
   wherein the grating coupler is provided with a plurality of bars each bar having a height h, the heights h of the bars gradually and approximately linearly increase relative to each other in the direction along which the guided optical wave travels, and each bar having an inclination b relative to the direction along the heights of the bars,
   the inclination b satisfies the condition $$b \geq 2\left(\frac{m}{aL^{m+1}}\right)^{1/m}$$

where a represents a coefficient which determines a radiation loss coefficient $\alpha$ ($\alpha = ah^m$, where $2 < m$), and L represents the length of the grating coupler, which length is taken in the direction along which the guided optical wave travels.

2. An optical waveguide device as defined in claim 1 wherein the optical wave is a laser beam.

3. An optical waveguide device as defined in claim 1 wherein the grating coupler is a linear grating coupler.

4. An optical waveguide device as defined in claim 1 wherein the grating coupler is a focusing grating coupler.

5. An optical waveguide device comprising:
   i) an optical waveguide for guiding an optical wave therethrough, and
   ii) a grating coupler located on a surface of the optical waveguide in order to introduce an external optical wave into the optical waveguide,
   wherein the grating coupler is provided with a plurality of bars, each bar having a height h the heights h of the bars gradually and approximately linearly decrease relative to each other in the direction along which the guided optical wave travels, and each bar having an inclination b relative to the direction along the heights of the bars,
   the inclination b satisfies the condition $$b \geq 2\left(\frac{m}{aL^{m+1}}\right)^{1/m}$$

where a represents a coefficient which determines a radiation loss coefficient $\alpha$ ($\alpha = ah^m$, where $2 < m$), and L represents the length of the grating coupler, which length is taken in the direction along which the guided optical wave travels.

6. An optical waveguide device as defined in claim 5 wherein the optical wave is a laser beam.

7. An optical waveguide device as defined in claim 5 wherein the grating coupler is a linear grating coupler.

8. An optical waveguide device as defined in claim 5 wherein the grating coupler is a focusing grating coupler.

* * * * *